(12) United States Patent
Junginger et al.

(10) Patent No.: US 8,301,629 B2
(45) Date of Patent: Oct. 30, 2012

(54) COMMUNITY-DRIVEN APPROACH FOR SOLVING THE TAG SPACE LITTERING PROBLEM

(75) Inventors: Michael Junginger, Stuttgart (DE);
Mareike Lattermann, Stuttgart (DE);
Andreas Nauerz, Stuttgart (DE);
Thomas Steinheber, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/974,182

(22) Filed: Dec. 21, 2010

(65) Prior Publication Data
US 2011/0153607 A1    Jun. 23, 2011

(30) Foreign Application Priority Data
Dec. 21, 2009   (EP) ..................................... 09180075

(51) Int. Cl.
*G06F 17/30*    (2006.01)
(52) U.S. Cl. ..................................... 707/737; 707/738
(58) Field of Classification Search ........................ None
See application file for complete search history.

(56) References Cited

U.S. PATENT DOCUMENTS

2008/0059897 A1* 3/2008 DiLorenzo .................... 715/764
2010/0332964 A1* 12/2010 Duman et al. ................ 715/230
* cited by examiner

*Primary Examiner* — Jean B Fleurantin
*Assistant Examiner* — Anteneh Girma
(74) *Attorney, Agent, or Firm* — Steven M. Greenberg, Esq.; Carey, Rodriguez, Greenberg & O'Keefe

(57) ABSTRACT

In order to provide an improved tagging-based search method, the method includes one-click actions for searching as well as an "one view" indicator telling the user which search would be the most effective or most important search—by displaying a "search cloud", called search bag.

7 Claims, 13 Drawing Sheets

FIG. 2 Inventional

FIG. 11

COMMUNITY-DRIVEN APPROACH FOR SOLVING THE TAG SPACE LITTERING PROBLEM

CROSS-REFERENCE TO RELATED APPLICATIONS

This application claims priority under 35 U.S.C. §119(a) to European Patent Application Serial Number 09180075.5, filed Dec. 21, 2009, entitled "A COMMUNITY-DRIVEN APPROACH FOR SOLVING THE TAG SPACE LITTERING PROBLEM", the entirety of which is incorporated herein by reference.

BACKGROUND OF THE INVENTION

1. Field of the Invention

The present invention relates to network-based communication and information discovery and pertains in particular to network-based storage and management of network-accessible resources.

2. Description of the Related Art

In recent years web-based systems such as enterprise information portals have gained importance in many companies. In the latter instance, the enterprise information portals integrate, as a single point of access, various applications and processes into one homogeneous user interface. Today, such systems include a huge amount of content. They are no longer exclusively maintained by an information technology (IT) department. Instead Web 2.0 techniques are used increasingly, allowing user generated content to be added. These systems grow quickly and in a more uncoordinated way as different users possess different knowledge and expertise and obey to different mental models.

The continuous growth makes access to really relevant information difficult. Users need to find task- and role-specific information quickly, but face information overload and often feel lost in hyperspace. Thus, users often miss out on resources that are potentially relevant to their tasks, simply because they never come across them. On the one hand, users obtain too much information that is not relevant to their current task, on the other hand, it becomes cumbersome to find the right information and they do not obtain all the information that would be relevant.

An emerging technology allowing users (single users in reference to private tags, or user communities in reference to public/collaborative tags) to structure or categorize content autonomously to ease and "personalize" navigation through such large, complex information spaces, is tagging. The recent popularity of collaboration techniques on the Internet, particularly tagging and rating, provides new means for both semantically describing Portal content as well as for reasoning about users' interests, preferences and contexts.

In this context, tagging is the process of assigning keywords (or metadata) to resources. A tag itself is "some" metadata associated to a resource. Tags themselves are non-hierarchical keywords taken from an uncontrolled vocabulary. Further in this context, a resource is an entity uniquely identifiable (addressable). In other words, a tag is a (relevant) keyword or term associated with or assigned to a piece of information (a picture, a geographic map, a blog entry, a video clip etc.), thus describing the item and enabling keyword-based classification and search of information.

Tags are usually chosen informally and personally by item author/creator or by its consumer/viewers/community. Tags are typically used for resources such as computer files, web pages, digital images, and internet bookmarks (both in social bookmarking services, and in the current generation of web browsers—see Flock). For this reason, "tagging" has become associated with other Web 2.0 technologies.

Tags can add valuable meta information and even lightweight semantics to web resources. Tag clouds represent the visual depiction of tags available in the system. Rating is the evaluation or assessment of something, in terms of quality (as with a critic rating a novel), quantity (as with an athlete being rated by his or her statistics), or some combination of both. That is, it is the process of assigning (e.g. numeric) "values" to resources indicating how much people "like" those. A rating itself is "some value" associated to a resource. Ratings themselves are chosen from an interval of possible "values" whereas the one end of the interval usually refers to "dislike" and the other to "like".

FIG. 1 gives an impression of the problem illustrating the most basic structural components of a prior art hardware and software environment used for a prior art tagging-based method when searching for some content. As shown in FIG. 1, web client 10 (one or more of a large plurality of them) cooperates with a web server 12 during his search for selected content. Tags 14 are used for characterising the content. There are many resources 16A . . . 16N available for being accessed by the searching person using his client 10 client with a respective Web Browser. Only accidentally the user finds the best suited content, because the tags 14 are often not selective enough for the searching user.

Many problems modern tagging systems deal with are related to synonymy and polysemy. Synonymy describes that fact that multiple tags can have the same meaning, either because they are a morphological variation (apple vs. apples) or a semantically similar (baby vs. infant). Polysemy describes tags that can have multiple meanings (e.g., apple can be the fruit or anything about the company Apple).

Today, systems try to overcome these things by applying stemming and normalization algorithms which most often only solve the problem with morphological variations.

Modern systems sometimes also leverage thesauri (e.g., WordNet) to overcome the issue with semantically similar terms.

The drawbacks of existing prior art can be summarized as follows:

Users can search for tags in prior art systems. What these kind of searches lack is an "a—priori indicator" about whether the search is effective at all and returns search results that are of high value to the searching person. A user searching for TAG_A has no clue about whether this search makes sense, neither about the fact that searching for TAG_A, TAG_B and TAG_C together would be very effective for him. Given the latter fact was known to the user, in prior art systems the user has to assemble the search over and over again by typing these tags or clicking multiple types which gets the more annoying the more tags are necessary for searching. Further, prior art search methods are language dependant, and polysemies can seldom be detected by prior art search and tagging methods.

SUMMARY OF THE INVENTION

A method of the invention comprises one-click actions for searching as well as an "one view" indicator telling the user which search would be the most effective or most important search—by displaying a "search cloud", called search bag.

According to an aspect of the present invention a method for searching for tagged resources stored in a data repository in a portal infrastructure is disclosed, comprising the steps of:

a) a web client receiving a portal page including the actual tag cloud and a GUI control for triggering a bagging mechanism for grouping tags for search of tagged resources, b) the web client triggering the bagging mechanism by a user based on his preferences for grouping tags which are frequently used together for searching tagged resources via the GUI control, c) the web client creating a request including user identification and information about the tags to be grouped together in a search bag, also referred to as tag cloud, and sending it to a tagging API of the portal, d) the portal web server creating a mapping entry in a data repository for the tags to be grouped with a grouping name—i.e. a search bag name—including user identification of the triggering user, wherein a selected group of community members are notified about the tag search group, i.e., this is summarized as search bag creation;

e) in case said triggering user requests the same portal page, the portal web server loading the actual tag cloud referenced to the portal page including the grouping that has been created by the triggering user, f) the web client displaying said tag cloud, or search bag, including the search groups of tags at said referenced portal page, wherein the method is characterized by the step of:

g) determining if a second search bag similar to the actual search bag exists in a pre-stored form at the portal server, h) if existing, displaying the similar search bag to the searching user, by which a recommendation of a search bag may take place offering some visual ranking which can be depicted by various given metrics.

As to above step e), in addition, search groupings, i.e. search bags created by other users are displayed, whereby the relevance of these search groupings are visualized, e.g., in a search bag cloud, in analogy to that what is known from prior art in a tag cloud. All displayed search groupings are preferably invokable by one-click actions.

Preferably, the search bags to be recommended to the user may be calculated out of:
The number of users that have created the same search bag,
The number of invocations of the search bag,
The Rating of the search results found with this search bag,
The date of creation and the location that has been laid down on search bag creation.
These features include automatically performed determinations of:
 how many of the search results that have been found via a given search bag have actually been viewed and for how long?
Have they been printed?
 the current location of the user, depending of whether sitting on the workstation in office, using a PDA or different mobile device; in this respect, e.g. travel searches would be more relevant in the latter case than in the first case.
 the timestamp of the search bag creation:
 During business hours, it is more likely that one searches for work—related stuff. In the weekends as well as after business, it is more likely to search for leisure—related things.

BRIEF DESCRIPTION OF THE DRAWINGS

The present invention is illustrated by way of example and is not limited by the shape of the figures of the drawings in which:

FIGS. 8 to 13 are exemplary GUI illustrations implementing the control flow, wherein FIG. 8 illustrates the Initial view before triggering search bag creation, FIG. 9 illustrates a search bag creation dialog, FIG. 10 illustrates a search bag recommendation popup menu, FIG. 11 illustrates an explicit search bag recommendation dialog for adding a user or group notification, FIG. 12 illustrates a search bag cloud—search bags with higher relevance are accented, and FIG. 13 illustrates a search bag result view including a control for rating the search bag currently used.

DETAILED DESCRIPTION OF THE INVENTION

Figure 1:
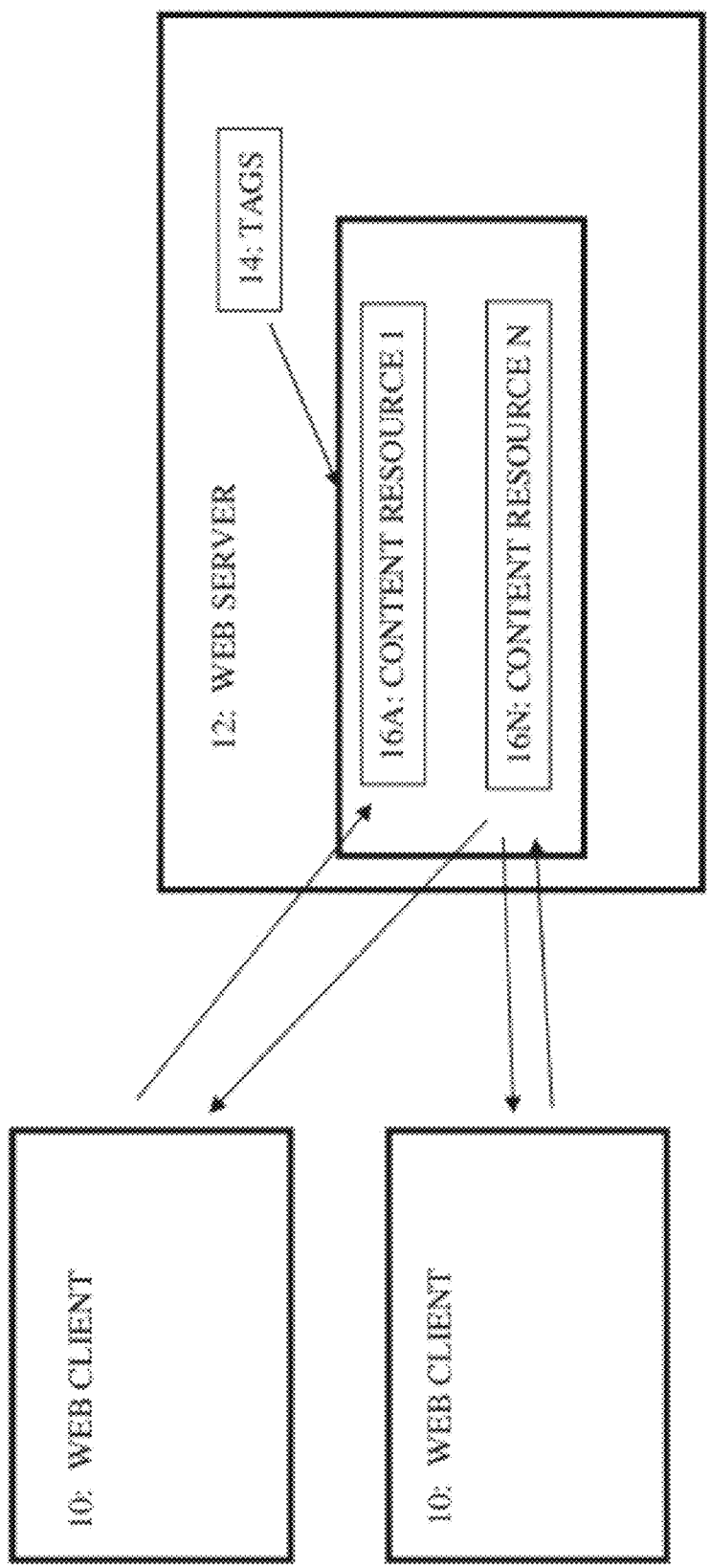
FIG. 1 illustrates the most basic structural components of a prior art hardware and software environment used for a prior art method.
Figure 2:
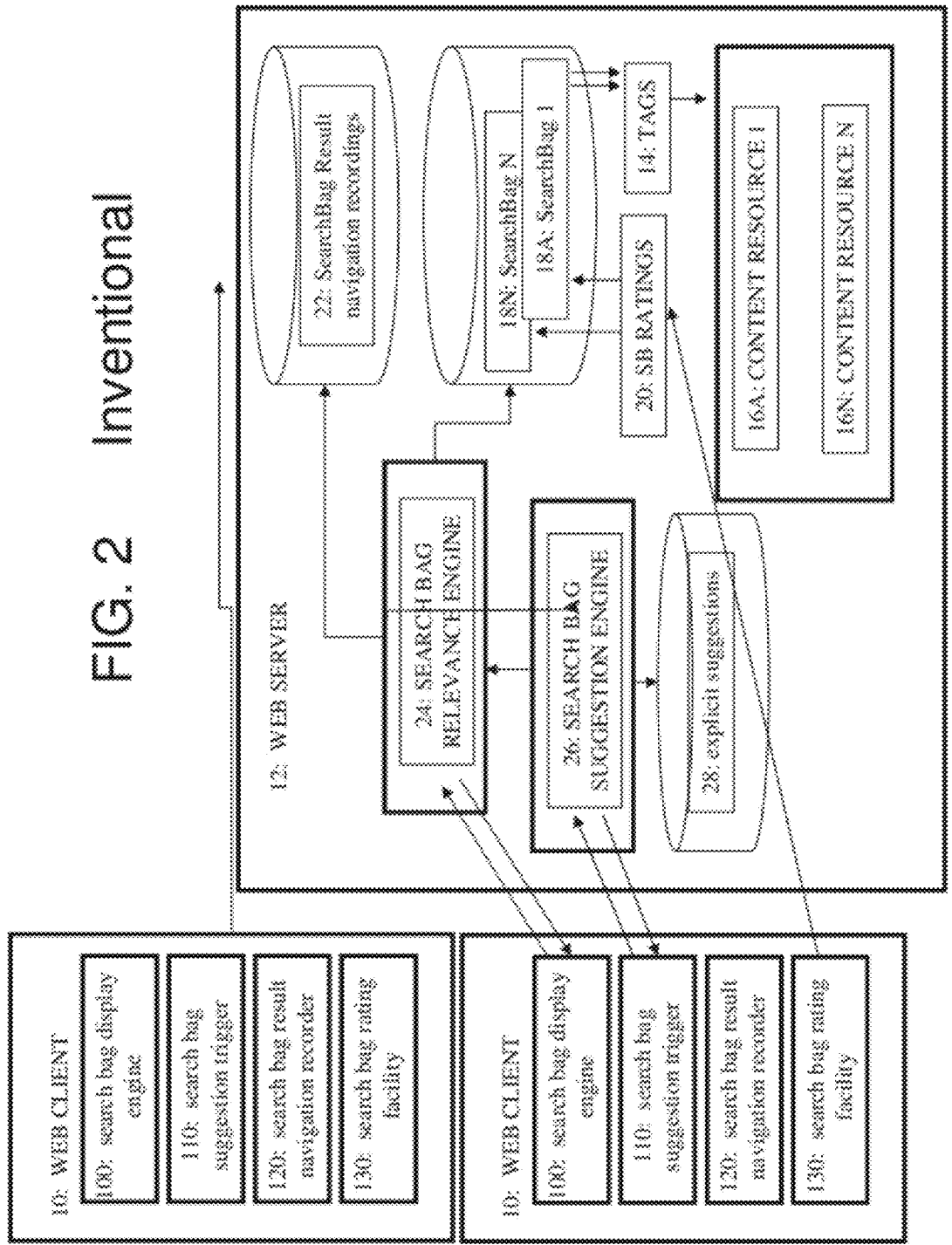
FIG. 2 illustrates the most basic structural components of a hardware and software environment used for a preferred embodiment of the method.

With general reference to the figures and with special reference now to reference to FIG. 2 a system view is described including the software functional components relating to the method of the invention.

Referring to FIG. 2, at the user site, the user's web client 10 selects the URL of the Web server 12 and loads the respective portal web site. During load the following software components are provided for the user, the function of which is identified via the respective descriptive component names, and which will be described in more detail with reference to FIG. 3 later below:
First, a search bag display engine 100;
Further, a search bag suggestion trigger 110;
Further, a search bag result navigation recorder 120;
Further, a search bag rating facility 130.

At the web server site, a search bag result navigation recordings database 22 is implemented and connected operatively to the client navigation recorder 120 and to a search bag relevance engine 24 which is implemented at the server site. Engine 24 is connected operatively to a search bag database storing 1 to N search bags. This database may also store searchbag ratings 20 and tags 14 linked to respective resources 16 (1 to N). Further, a search bag suggestion engine 26 is implemented and operatively connected to the client side trigger component 110. Further, a database 28 storing explicit suggestions of search bags is implemented. Further the search bag rating facility at the client side is operatively connected to the search bag rating 20 storage.

Figure 3:
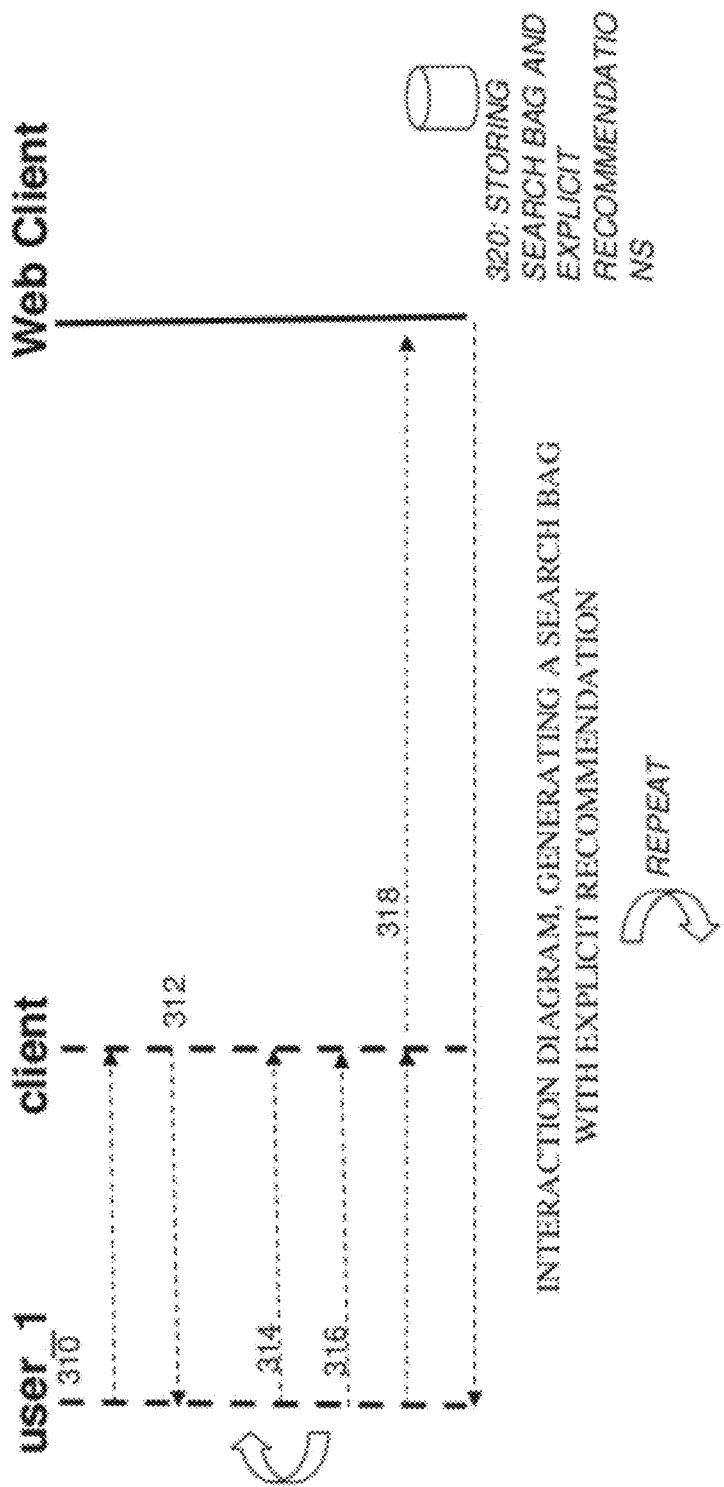
FIG. 3 illustrates the control flow of steps of a preferred embodiment of the method in a web client and in a web server, as well as their interaction, when performing a searchbag creation including explicit recommendation.

With additional reference to FIG. 3 an interaction diagram, is shown for illustrating the workflow between a user interacting with a portal system by means of his web browser 10

(see web client left side) and a web server client 12 (right side) which serves the user request in the context of creating search bags according to the invention. In a first step 310 a user triggers the search bag creation which results in a dialog displayed to the user as a response 312 offering input fields for adding tags to a search bag as well as assigning a name to the search bag in question. In step 314 the user adds tags to the search bag creation dialog. This can be accomplished via drag and drop from an existing tag cloud as well as by manually typing tag names to be added to the search bag. Step 314 is repeated until the user considers the search bag to be complete. The user may add other users or groups which are to be notified about this search bag creation, step 316.

The user is assumed to complete the search bag creation by pressing a button "store search bag" 318 which results in a request with the user—entered information being sent to the web server. In Step 320 the information being entered by the user—for example tag names, searchbag display name, private/collaborative flag, the current user location, etc.—is stored in the data backends, symbolized by a database symbol at the web server 12 in the storage components 18 and 28 at the web server side (see also right side of FIG. 2). This comprises preferably also updating the count how often this given combination of tags has been used for creating a search bag. This feature is advantageously usable for establishing a community driven ranking which is in turn usable for recommending e.g., by some action of USER_A recommending his just-created search bag to USER_B, existing search bags with a high relative count to a new user who searches for content tagged by a keyword he is typing-in, and comprised of such searchbag. For accepting explicitly suggested search bags—e.g. from USER_A to USER_B-, USER_B will face a user interface (UI) display fragment right when page loading which may suggest him to adopt the explicitly suggested bags.

Figure 4:
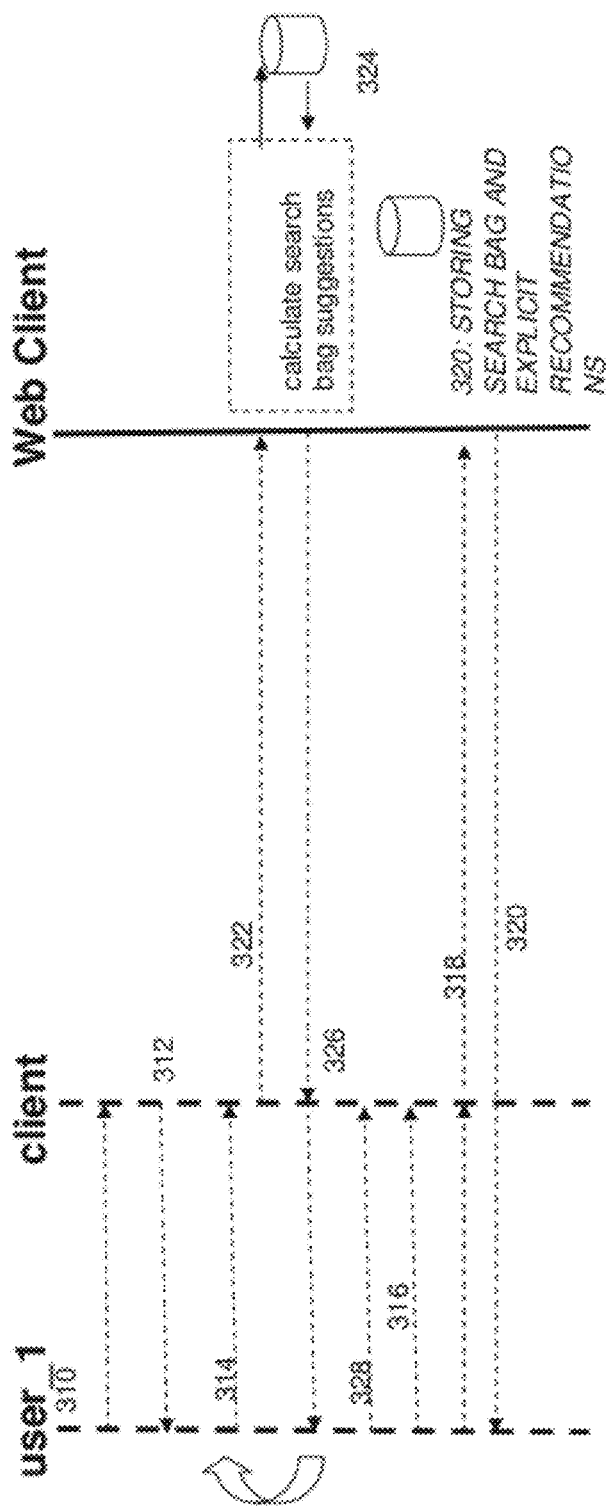
FIG. 4 illustrates the control flow according to FIG. 3, additionally including an search bag suggestion calculation.

With reference to FIG. 4 illustrating the control flow according to FIG. 3, additionally including a search bag suggestion calculation, this sequence diagram includes the interaction with a search bag recommendation mechanism implemented based on the before-mentioned count. Each tag being added to the search bag results in a step 322, in which a request is sent to the web server containing the tags that have been added by the users at this point in time. Based on prior art evaluation techniques, similarity and evaluation metrics as well as based on date- and location-information previously persisted by other users, a set of recommended search bags is computed, step 324.

The results of the previous algorithms are contained in the subsequent response to the web client in step 326 and are presented to the user who is assumed to be in the course of creating a tag bag. The user may accept one of the suggestions provided with the response of step 326 and may communicate his selection to the client, step 328 or continue adding further tags to his tag bag. Steps 314, 322, 324, 326 may be repeated until the user thinks that the search bag is adequately filled with useful tags. The user may add other users or groups which are to be notified about this search bag creation, step 316. The user is then assumed to complete the search bag creation by pressing a button "store search bag" 318 which results in a request with the user—entered information being sent to the web server—see the FIG. 3 procedure above.

Figure 5:
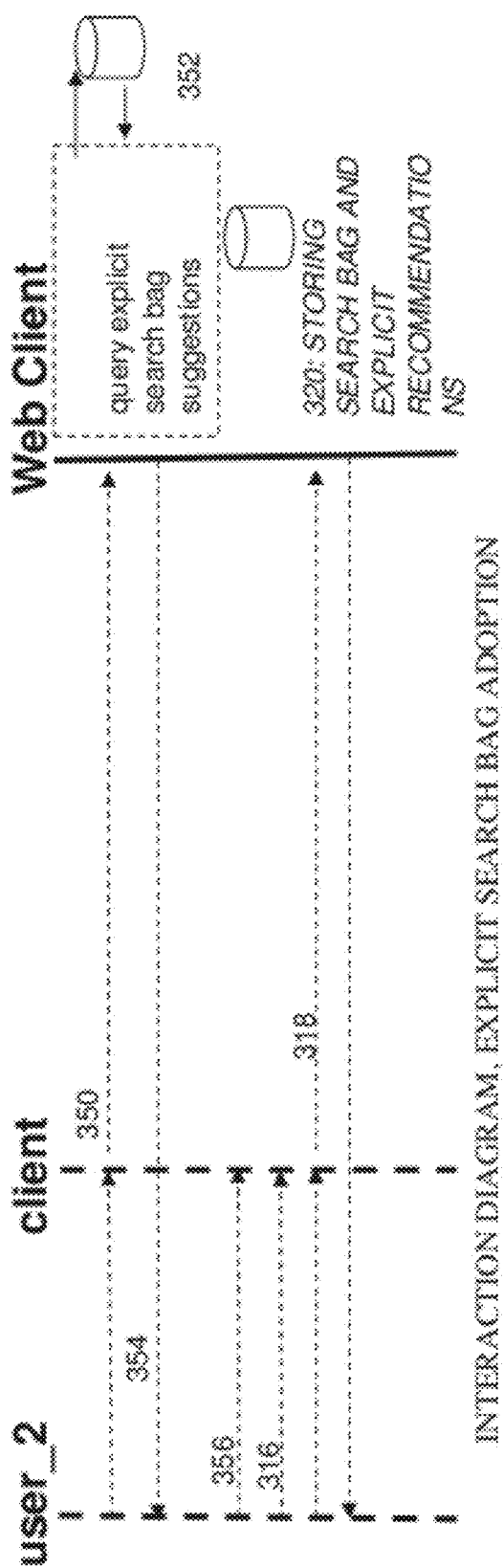
FIG. 5 illustrates the control flow of steps of a preferred embodiment of the method in a web client and in a web server, as well as their interaction, when performing an explicit search bag adoption out of explicit recommendations that have been sent by other users for the invoking user.

With reference now to FIG. 5 an interaction diagram is shown illustrating the control flow of steps of a preferred embodiment of the method of the invention in a web client and in a web server, as well as their interaction, when performing an explicit search bag adoption. In a first step 350 a user navigates to the system including the implementation of steps as described before with reference to FIGS. 3 and 4. This navigation triggers a request to the webserver containing the current user's identification during which the data backends are queried for explicit search bag recommendations for this user which might have been created by other users working in a similar context and thus having similar interests, step 352. The result of these backend queries are contained in the response presented to the client, step 354. The user may accept one or multiple of the explicit search bag recommendations that have been created by his peers, step 356. The user may add other users or groups which are to be notified about this search bag creation step 316. The user is then assumed to complete the search bag creation as described further above.

Figure 6:
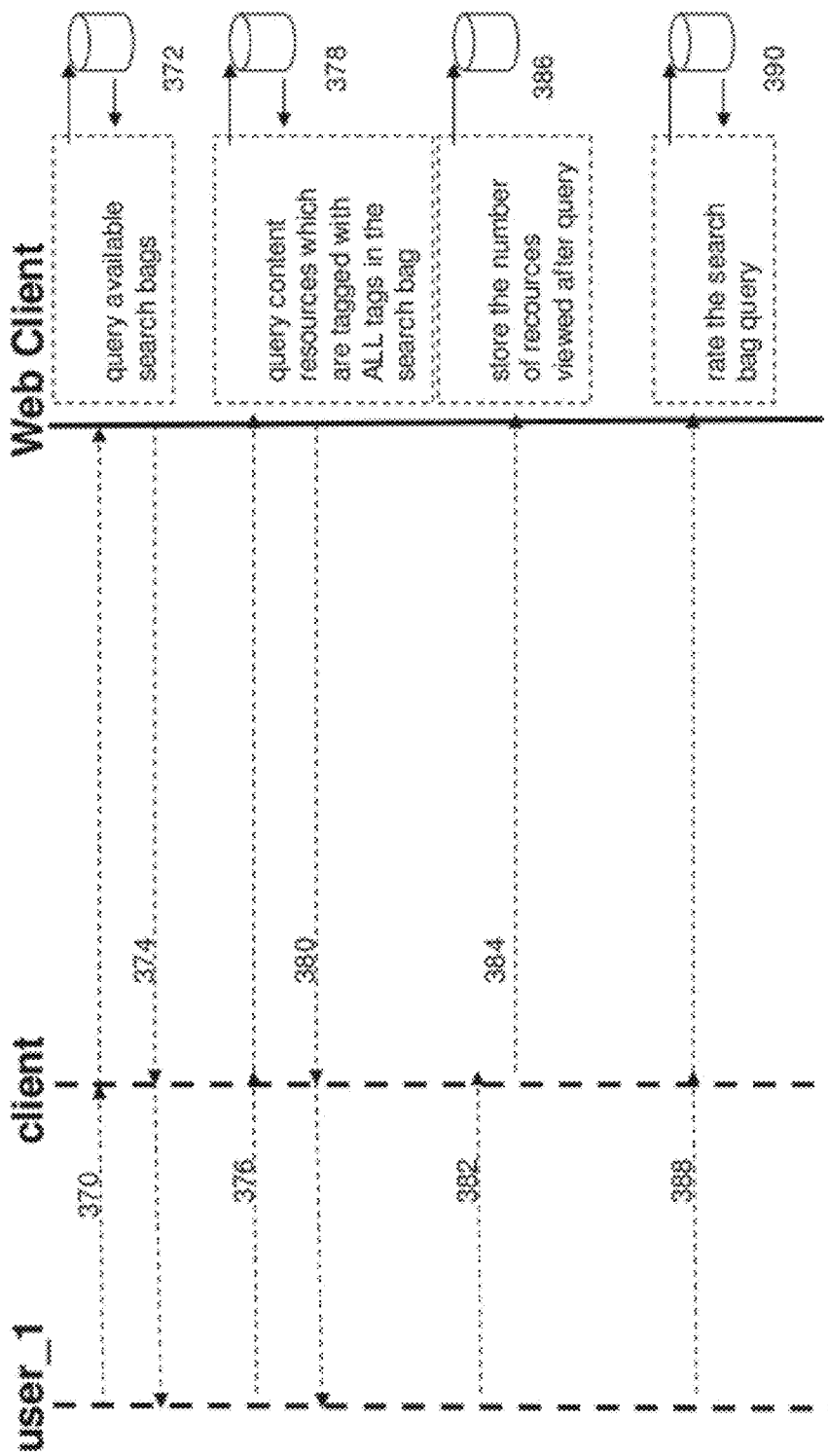
FIG. 6 illustrates the control flow of steps of a preferred embodiment of the method in a web client and in a web server, as well as their interaction, when using a searchbag and the process of searchbag usability rating.

With reference to FIG. 6 an interaction diagram is shown for illustrating the workflow between a user interacting with a portal system and the search bag cloud/view by means of his web browser (left side) and a web server client (right side) which serves the user request in the context of rating a search bag query according to a preferred embodiment of the invention.

In a first step 370 a user navigates to the system including the implementation described herein. This triggers a request to the web server including the user identification. As a result of this request, all search bags which are available for this user are loaded from the data backends. These include collaborative search bags created by different users as well as private search bags the user has created for himself, step 372. The results of the query are presented to the user in a comprehensive user interface—step 374, which enables him to directly invoke one of the presented search bags through a one-click action.

The user invokes a search bag SB_1 via a simple click 376 resulting in a request being sent to the web server for retrieval of search results. Subsequently, the content resources are queried from the data backends which have been associated with all of the tags contained in the search bag submitted by the user interfacing with the system, step 378. In addition, the number of searches performed with the given search bag SB_1 is recorded as well. These results are provided to the user in the following response from the web server, step 380. The user may navigate to each of the content resources contained in the result set, step 382.

Each of these invocations is recorded and sent back to the webserver, step 384. Thus, the number of resources viewed after a search with search bag SB_1 is stored in the backend—step 386, which serves as a measurement for the quality and relevance of this search bag.

After reviewing the search results provided upon searching for the given search bag, the user may evaluate the results and add a rating for the search that has been executed. This results in a request sent to the web server containing information about the search bag being executed—SB_1 in this case and the rating value the end user wants to apply to this search bag, step 388.

Thus, a rating for the search bag executed previously will be stored in the data backends 390.

Figure 7:
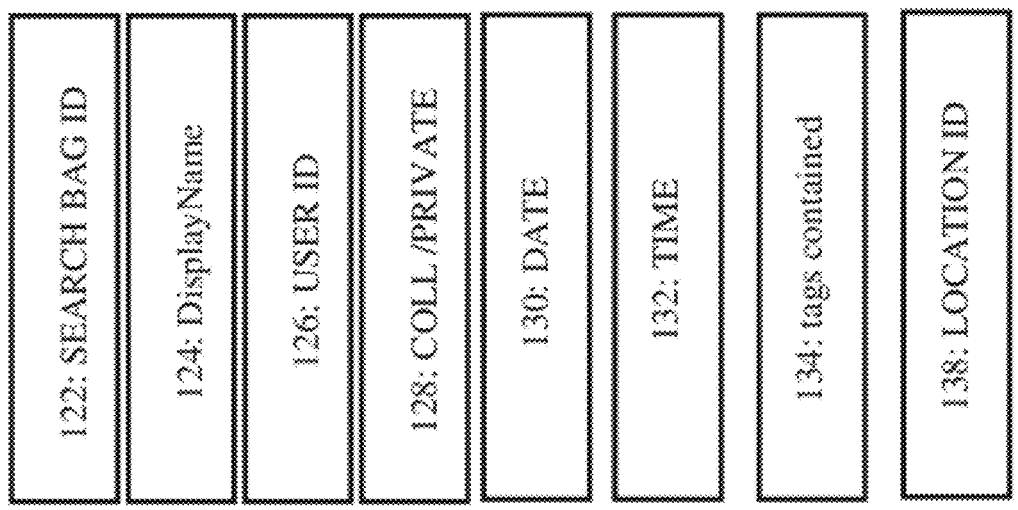
FIG. 7 illustrates an exemplary data structure for storing search bags.

Next, the data structures used in the method are described. FIG. 7 illustrates an exemplary data structure for storing search bags. It comprises a search bag ID 122 identifying a search bag uniquely at least within the portal server in question. A display name 124 for the search bag is useful for guiding a user selectively and efficiently to the very search bag which is adequate for his search interest. A user ID 126 is used for achieving an association between a user's search bag and this user's community or communities he is member of. A flag 128 distinguishing private and collaborative search bags is useful as always personal themes and subjects will exist which are of private or confidential nature and which are thus restricted from a collaborative or even a public access. Date information 130 may also include day time 132. This data is useful in particular for ranking purposes, as normally actual occurrences are rated higher than older ones. Besides that, on a weekend, it is likely that one is executing "leisure"—related searches whereas during business hours work-related searches are of greater importance. Field 134 comprises the tags comprised of the search bag. This may include the before-mentioned synonyms, and different-language translations of the same tag, abbreviations, or trendy expressions currently used for a tag in a certain community or in generality. Field 138, finally is a location ID specifying the location of the user's computer. Location here could for example be "business pc in office" vs PDA while travelling. While accessing systems from mobile devices, one is very likely to be on the way which in turn can have an influence on the importance of train timetable or flight searches.

Figure 8:
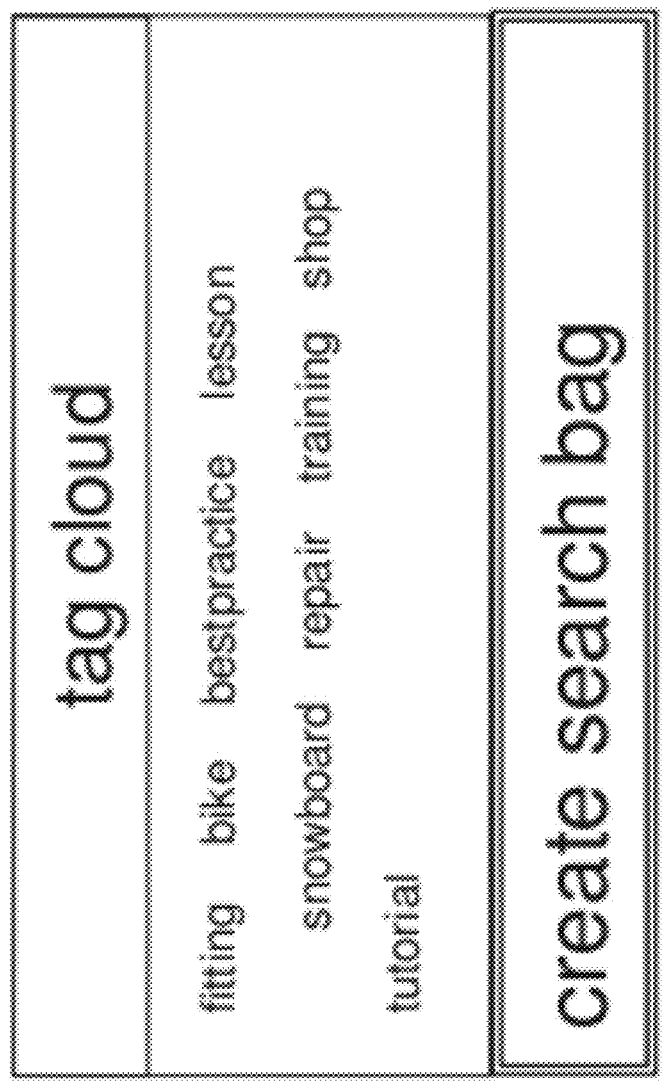

FIGS. 8 to 13 are exemplary GUI illustrations implementing the user interface for control flow, wherein:

FIG. 8 illustrates the Initial view before triggering the search bag creation, wherein a tag cloud is presented to the user and a control for creating an own adequate search bag.

Figure 9:
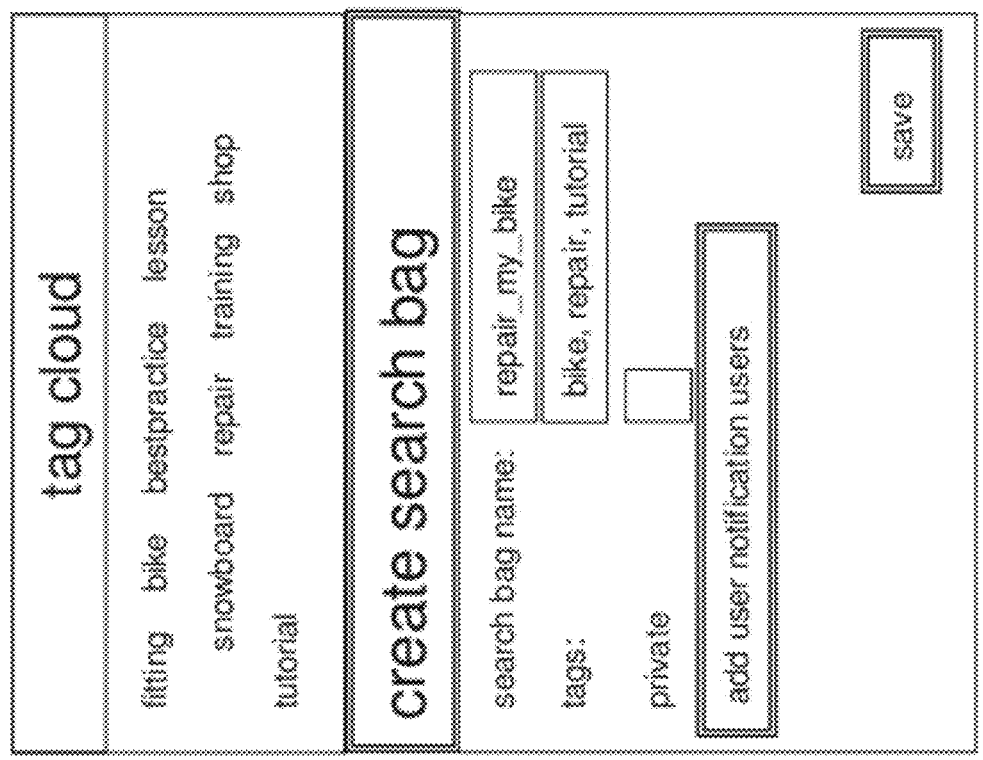

FIG. 9 illustrates a subsequent search bag creation dialog being presented when clicking "create search bag" control in FIG. 8. Advantageously, a search bag name is entered by the user, and tags are copied via drag and drop from the tag cloud above. Then the user may click the "private" control and specify if user notification is desired. Then the created search bag is saved by clicking the "save" button. Explicitly recommended search bags are preferably immediately shown to the end-user.

Figure 10:
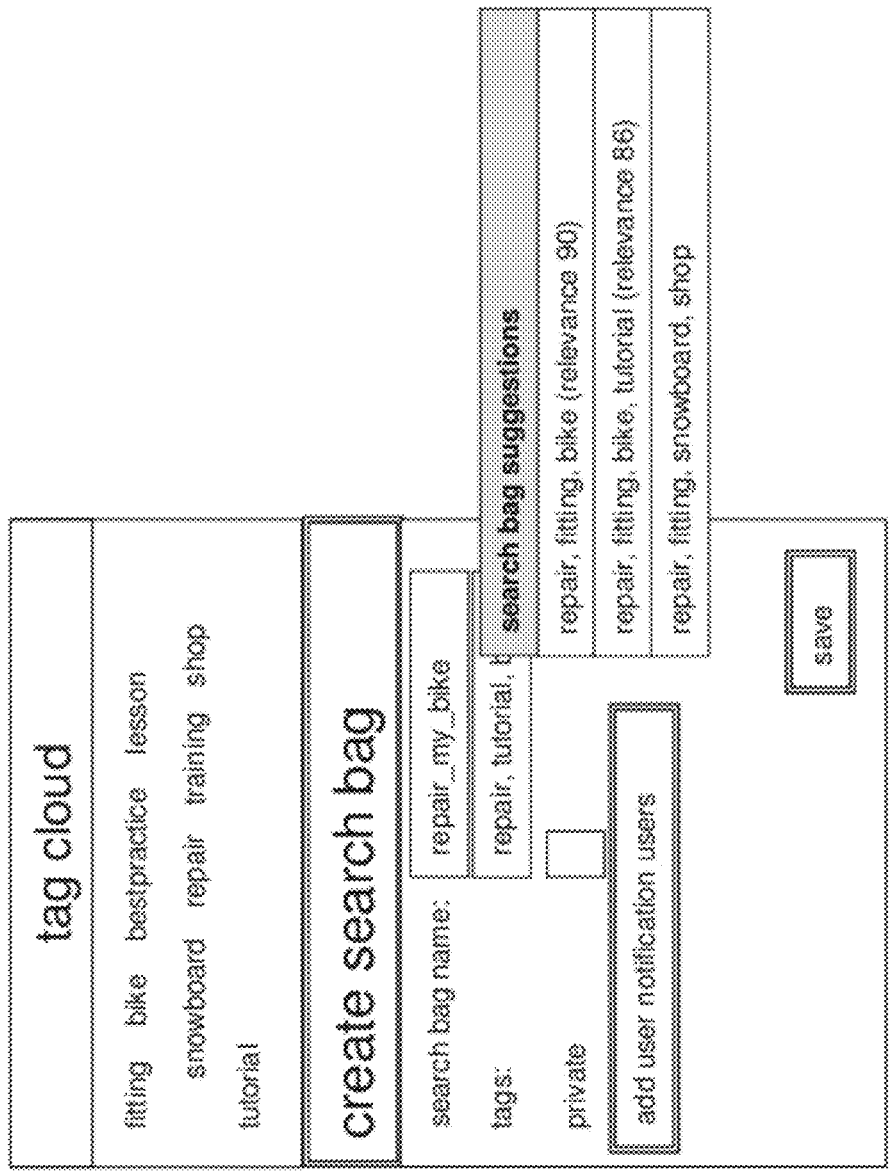

FIG. 10 illustrates a search bag recommendation popup menu. This is presented to the user preferably before he is invited to create an own search bag. Three existing search bags are offered or suggested to him in response to the tags entered before, namely "bike, repair and tutorial. A search bag is recommended when a rating factor displayed seems quite high for the user, i.e. near to the value of "100". Or, alternatively or in combination, the recommendation can be based on the similarity to search bags that have been previously created by different users.

Figure 11:
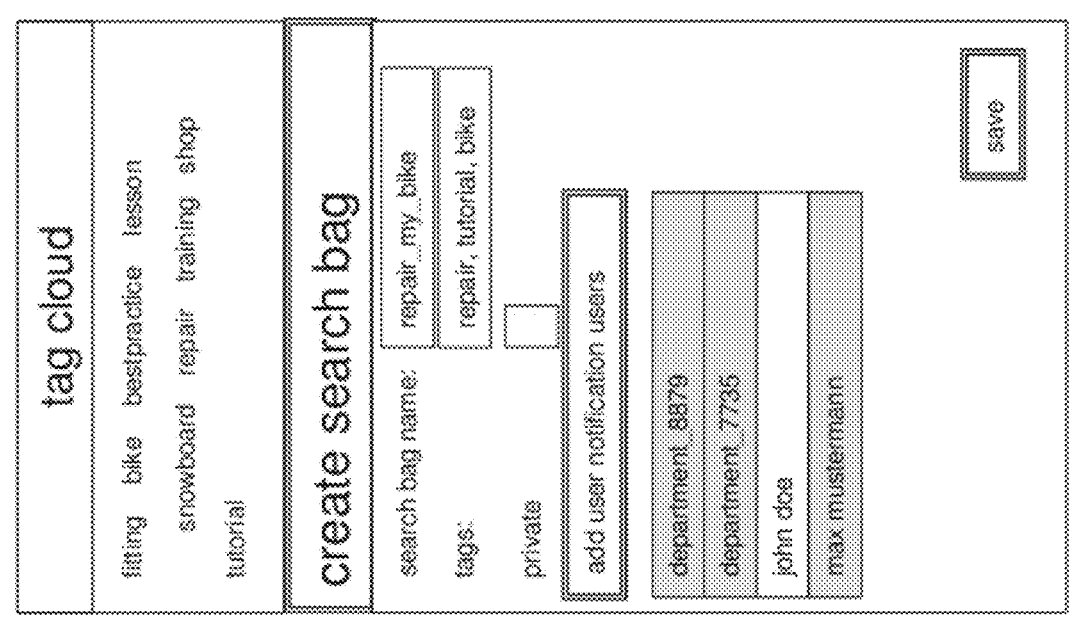

FIG. 11 illustrates an explicit search bag recommendation dialog for adding a user notification or a group notification. Upon highlighting one or more of the list items, respective notification procedures are triggered.

Figure 12:
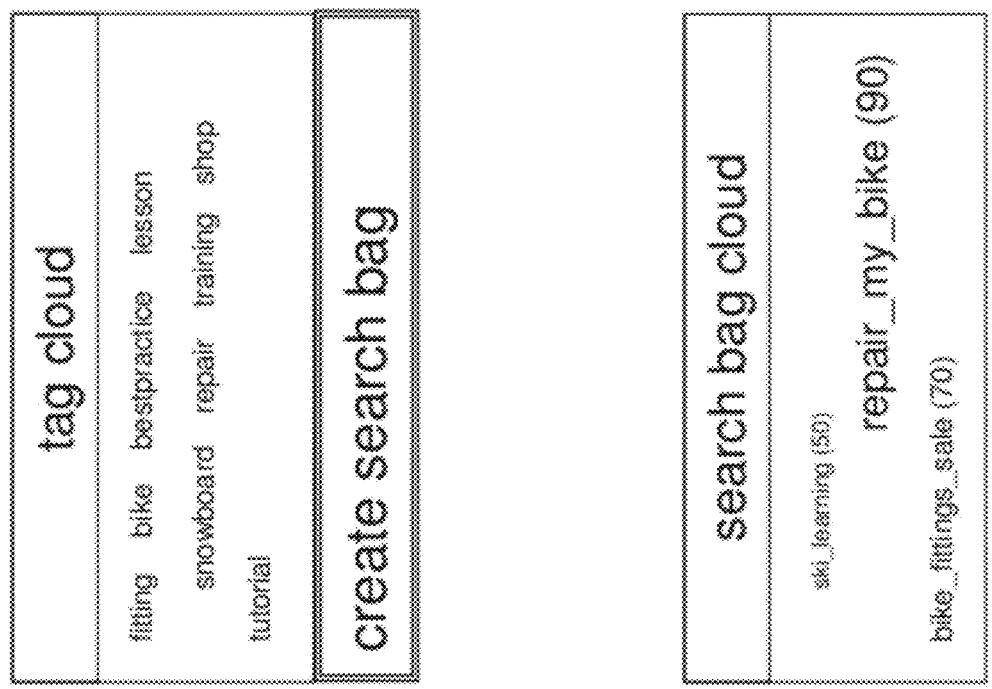

FIG. 12 illustrates an existing search bag cloud wherein search bags with higher relevance obtained from a ranking procedure are accented, respectively. This is offered to the user preferably prior to let him create his own search bag.

Figure 13:
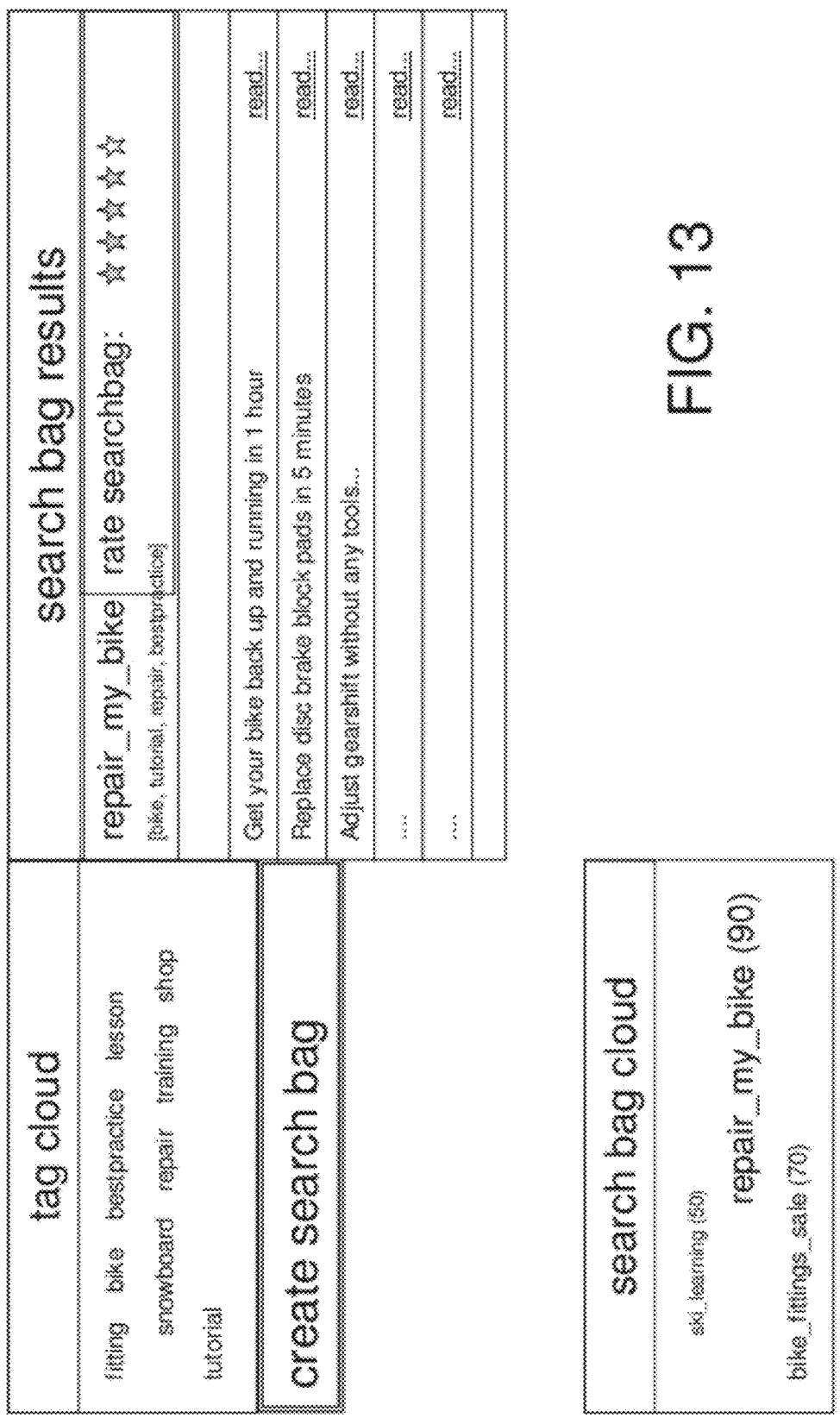

FIG. 13 illustrates a search bag result view including a control for rating the search bag currently used. The user may rate the search bag "repair_my_bike with 0 to 5 (best) stars.

The before mentioned preferred embodiments of the methods can be modified in further aspects:

The significance of a given search bag can be calculated based on various metrics. This may include:

The date of search bag creation,
The location by the time the search bag has been created,
The number of clicks on a search bag,
The number of clicks on the results supplied by a search bag search,
The explicit rating of a search bag result by a given user.

Furthermore, one can end up with a pluggable architecture where any exploiter of the method of the invention can add more and more metrics that can influence the grade of relevance of a search bag.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for searching for tagged resources stored in a data repository in a portal infrastructure comprising the steps of:
   a) receiving a portal page including an actual tag cloud and a GUI control for triggering a bagging mechanism for grouping tags for search of tagged resources,
   b) triggering (310) said bagging mechanism by a user based on his preferences for grouping tags which are frequently used together for searching tagged resources via said GUI control,
   c) creating (312, 314, 318) a request for building a search bag including user identification and information about the tags to be grouped together in said search bag and sending it to the tagging API of said portal,
   d) creating (320) a mapping entry in a data repository for said tags to be grouped in said search bag with a grouping name including user identification of said triggering user, wherein a selected group of community members are notified about said search bag,
   e) responsive to said triggering user requesting (350) the same portal page, loading (352) the actual search bag referenced to said portal page including the grouping that has been created by said triggering user, f) displaying (354) said search bag including said groups of tags at said referenced portal page, characterized by the steps of:

g) determining (350) if a second search bag similar to said actual search bag exists in a pre-stored form at said portal server, h) responsive to determining a second search bag similar to said actual search bag existing in pre-stored form at said portal server, displaying (354) said similar search bag to said searching user.

2. The method according to claim 1, further comprising the step of calculating (324) a search bag recommendation by using at least one of the members of the following group:
   a) a count representing the number of invocations of said search bag by users,
   b) a user rating measure,
   c) user behaviour measurements.

3. The method according to claim 1, further comprising the step of a user adopting one or more search bag recommendations recommended by said web server.

4. The method according to claim 1, further comprising the step of offering a User Interface for rating the usability of a search bag by a user.

5. The method according to claim 1, further comprising the step of offering a user interface element by which a display of prestored search bags are invokable by a one-click action of the user.

6. An electronic data processing system usable for searching for tagged resources stored in a data repository in a portal infrastructure, the system comprising:

a computer with at least one processor and memory; and,
   a functional component executing in the memory of the computer and performing the steps of:
   a) receiving a portal page including an actual tag cloud and a GUI control for triggering a bagging mechanism for grouping tags for search of tagged resources,
   b) triggering (310) said bagging mechanism by a user based on his preferences for grouping tags which are frequently used together for searching tagged resources via said GUI control,
   c) creating (312, 314, 318) a request for building a search bag including user identification and information about the tags to be grouped together in said search bag and sending it to the tagging API of said portal,
   d) creating (320) a mapping entry in a data repository for said tags to be grouped in said search bag with a grouping name including user identification of said triggering user, wherein a selected group of community members are notified about said search bag,
   e) responsive to said triggering user requesting (350) the same portal page, loading (352) the actual search bag referenced to said portal page including the grouping that has been created by said triggering user,
   f) displaying (354) said search bag including said groups of tags at said referenced portal page, characterized by the steps of:
   g) determining (350) if a second search bag similar to said actual search bag exists in a pre-stored form at said portal server,
   h) responsive to determining a second search bag similar to said actual search bag existing in pre-stored form at said portal server, displaying (354) said similar search bag to said searching user.

7. A computer program product usable for searching for tagged resources stored in a data repository in a portal infrastructure, comprising a computer useable storage medium storing a computer readable program, wherein the computer readable program includes a functional component that when executed on a computer causes the computer to perform the steps of:
   a) receiving a portal page including an actual tag cloud and a GUI control for triggering a bagging mechanism for grouping tags for search of tagged resources,
   b) triggering (310) said bagging mechanism by a user based on his preferences for grouping tags which are frequently used together for searching tagged resources via said GUI control,
   c) creating (312, 314, 318) a request for building a search bag including user identification and information about the tags to be grouped together in said search bag and sending it to the tagging API of said portal,
   d) creating (320) a mapping entry in a data repository for said tags to be grouped in said search bag with a grouping name including user identification of said triggering user, wherein a selected group of community members are notified about said search bag,
   e) responsive to said triggering user requesting (350) the same portal page, loading (352) the actual search bag referenced to said portal page including the grouping that has been created by said triggering user,
   f) displaying (354) said search bag including said groups of tags at said referenced portal page, characterized by the steps of:
   g) determining (350) if a second search bag similar to said actual search bag exists in a pre-stored form at said portal server,
   h) responsive to determining a second search bag similar to said actual search bag existing in pre-stored form at said portal server, displaying (354) said similar search bag to said searching user.

* * * * *